(12) United States Patent
Kobayashi

(10) Patent No.: US 10,419,775 B2
(45) Date of Patent: Sep. 17, 2019

(54) MOVING IMAGE ENCODING APPARATUS, IMAGE CAPTURING APPARATUS, MOVING IMAGE ENCODING METHOD, AND NON-TRANSITORY COMPUTER READABLE STORAGE MEDIUM

(71) Applicant: CANON KABUSHIKI KAISHA, Tokyo (JP)

(72) Inventor: Yukifumi Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 15/333,362

(22) Filed: Oct. 25, 2016

(65) Prior Publication Data

US 2017/0127078 A1    May 4, 2017

(30) Foreign Application Priority Data

Oct. 30, 2015 (JP) .................. 2015-214801

(51) Int. Cl.
| | |
|---|---|
| H04N 19/50 | (2014.01) |
| H04N 19/124 | (2014.01) |
| H04N 19/176 | (2014.01) |
| H04N 19/80 | (2014.01) |
| H04N 19/117 | (2014.01) |
| H04N 19/136 | (2014.01) |
| H04N 19/82 | (2014.01) |

(52) U.S. Cl.
CPC ........... *H04N 19/50* (2014.11); *H04N 19/117* (2014.11); *H04N 19/124* (2014.11); *H04N 19/136* (2014.11); *H04N 19/176* (2014.11); *H04N 19/80* (2014.11); *H04N 19/82* (2014.11)

(58) Field of Classification Search
None
See application file for complete search history.

(56) References Cited

U.S. PATENT DOCUMENTS

| | | | |
|---|---|---|---|
| 9,628,822 B2 | 4/2017 | Leontaris et al. | |
| 9,736,485 B2 | 8/2017 | Endo | |

(Continued)

FOREIGN PATENT DOCUMENTS

| | | |
|---|---|---|
| JP | 2012-005113 | 1/2012 |
| JP | 2014-110509 A | 6/2014 |

(Continued)

OTHER PUBLICATIONS

U.S. Appl. No. 15/348,153, filed Nov. 10, 2016.

(Continued)

*Primary Examiner* — Xiaolan Xu
(74) *Attorney, Agent, or Firm* — Venable LLP

(57) ABSTRACT

A moving image encoding apparatus comprising, an encoding unit, a decoding unit, a filter unit and an offset processing unit wherein the encoding unit performs predictive encoding based on a decoded image having undergone an offset processing and the offset processing unit selects and executes a first offset processing for a low-frequency component image when an image of the block has a feature associated with the low-frequency component image in accordance with a feature of an image of a processing target block, and selects and executes a second offset processing for a high-frequency component image when an image of the block does not have a feature associated with the low-frequency component image.

7 Claims, 10 Drawing Sheets

(56) References Cited

U.S. PATENT DOCUMENTS

| | | | | |
|---|---|---|---|---|
| 2009/0016631 A1* | 1/2009 | Naito | ............ | H04N 19/176 |
| | | | | 382/251 |
| 2015/0189301 A1 | 7/2015 | Endo | | |
| 2015/0215617 A1* | 7/2015 | Leontaris | ............ | H04N 19/82 |
| | | | | 375/240.03 |
| 2016/0307302 A1* | 10/2016 | Chou | ............ | H04N 19/117 |

FOREIGN PATENT DOCUMENTS

| | | |
|---|---|---|
| JP | 2015-128239 A | 7/2015 |
| WO | 2015/083796 A1 | 6/2015 |
| WO | 2015/116472 A1 | 8/2015 |

OTHER PUBLICATIONS

Sakae Okubo et al., "H.264/AVC Textbook: 3rd Revised Edition" published in Jan. 1, 2009, pp. 10-12.
Tokumichi Murakami et al.,"High Efficiency Video Coding—HEVC/H.265 and its Application", published in Feb. 25, 2013, pp. 66-69.

* cited by examiner

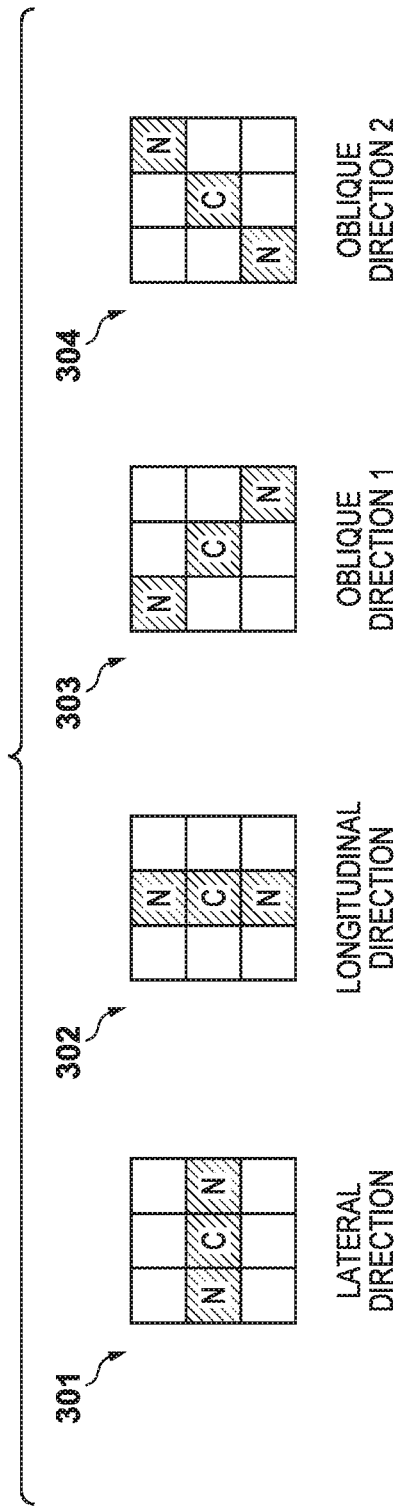
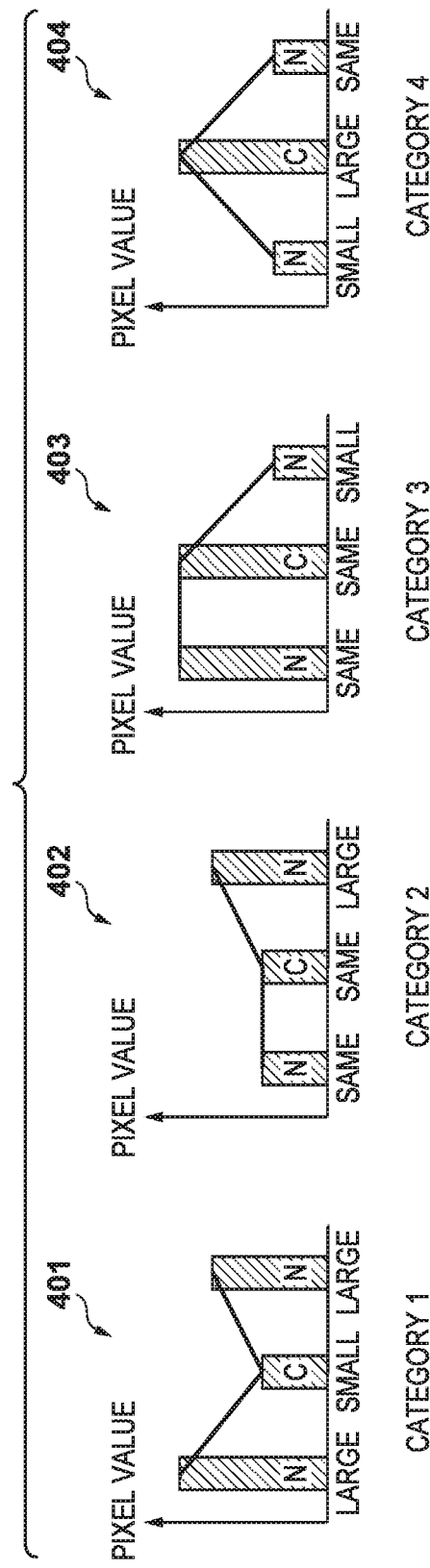
FIG. 3
FIG. 4

MOVING IMAGE ENCODING APPARATUS, IMAGE CAPTURING APPARATUS, MOVING IMAGE ENCODING METHOD, AND NON-TRANSITORY COMPUTER READABLE STORAGE MEDIUM

BACKGROUND OF THE INVENTION

Field of the Invention

The present invention relates to a moving image encoding apparatus, an image capturing apparatus, a moving image encoding method, and a non-transitory computer readable storage medium.

Description of the Related Art

There has been a proliferation of digital equipment capable of recording moving images, such as digital video cameras and hard disk recorders. Such digital equipment performs compression encoding of moving image data to efficiently record a moving image having a large information amount on a recording medium such as a flash memory or hard disk having a limited capacity.

The H.264 encoding scheme is a typical moving image compression encoding scheme. The H.264 encoding scheme is a popular moving image compression encoding scheme which has been used for a high definition recording system for video cameras and broadcasting (see Sakae Okubo, Shinya Kadono, Yoshihiro Kikuchi, and Teruhiko Suzuki, "H.264/AVC Textbook: 3rd Revised Edition" published in Jan. 1, 2009).

Recently, with the advent of, for example, 4K television, there has been a tendency to increase the resolution and frame rate of a moving image. Along with this tendency, there is a demand to further improve the compression efficiency of a moving image. The HEVC (High Efficiency Video Coding) scheme as a succeeding standard of the H.264 encoding scheme has been developed as an international standard, which is a high-efficiency moving image compression encoding scheme. The HEVC scheme is said to be about twice higher in compression efficiency than the H.264 encoding scheme, and is expected to be used for next-generation moving image digital equipment. That is, this is a moving image compression encoding scheme which is likely to become very popular in the future (see Tokumichi Murakami, Kotaro Asai, and Shunichi Sekiguchi, "High Efficiency Video Coding—HEVC/H.265 and its Application", published in Feb. 25, 2013).

There is available a technique called SAO (Sample Adaptive Offset) as an encoding tool newly adopted in the HEVC scheme. This is a process applied to a decoded image after deblocking filtering and has great contribution to an improvement in image quality in the HEVC scheme (see Japanese Patent Laid-Open No. 2012-5113).

SAO includes a band offset processing and an edge offset processing. At the time of encoding, it is decided, on a CTU (Coding Tree Unit) basis, which one of the processes is performed or to perform neither of them. When performing a band offset processing, band positions and offset values are decided, and then the corresponding parameters are encoded. When performing an edge offset processing, edge positions and offset values are decided, and then the corresponding parameters are encoded.

When deciding parameters for SAO at the time of encoding, it is necessary to check band positions and edge directions on a pixel basis and perform, for example, processing for calculating proper offset values. Assume that these processes are performed for all patterns in SAO, evaluation values are calculated, and parameters are decided based on the evaluation values. In this case, the processing amount becomes enormous.

SUMMARY OF THE INVENTION

The present invention provides a technique capable of reducing a processing amount while keeping high image quality based on SAO in a moving image encoding apparatus.

One aspect of embodiments of the invention relates to a moving image encoding apparatus comprising, an encoding unit configured to perform predictive encoding for an encoding target image on a block basis, a decoding unit configured to generate a decoded image by decoding the target image having undergone the predictive encoding, a filter unit configured to apply deblocking filtering to the decoded image, and an offset processing unit configured to perform an offset processing for the decoded image having undergone the deblocking filtering, wherein the encoding unit performs the predictive encoding based on the decoded image having undergone the offset processing by the offset processing unit, and the offset processing unit selects and executes a first offset processing for a low-frequency component image when an image of the block has a feature associated with the low-frequency component image in accordance with a feature of an image of a processing target block, and selects and executes a second offset processing for a high-frequency component image when an image of the block does not have a feature associated with the low-frequency component image.

Further features of the present invention will become apparent from the following description of exemplary embodiments (with reference to the attached drawings).

BRIEF DESCRIPTION OF THE DRAWINGS

FIG. 3 is a view for explaining edge directions in an edge offset processing according to the embodiment of the present invention;

FIG. 4 is a view for explaining categories of an edge offset processing according to the embodiment of the present invention;

DESCRIPTION OF THE EMBODIMENTS

The embodiments of the present invention will be described below with reference to the accompanying drawings.

First Embodiment

Figure 1:
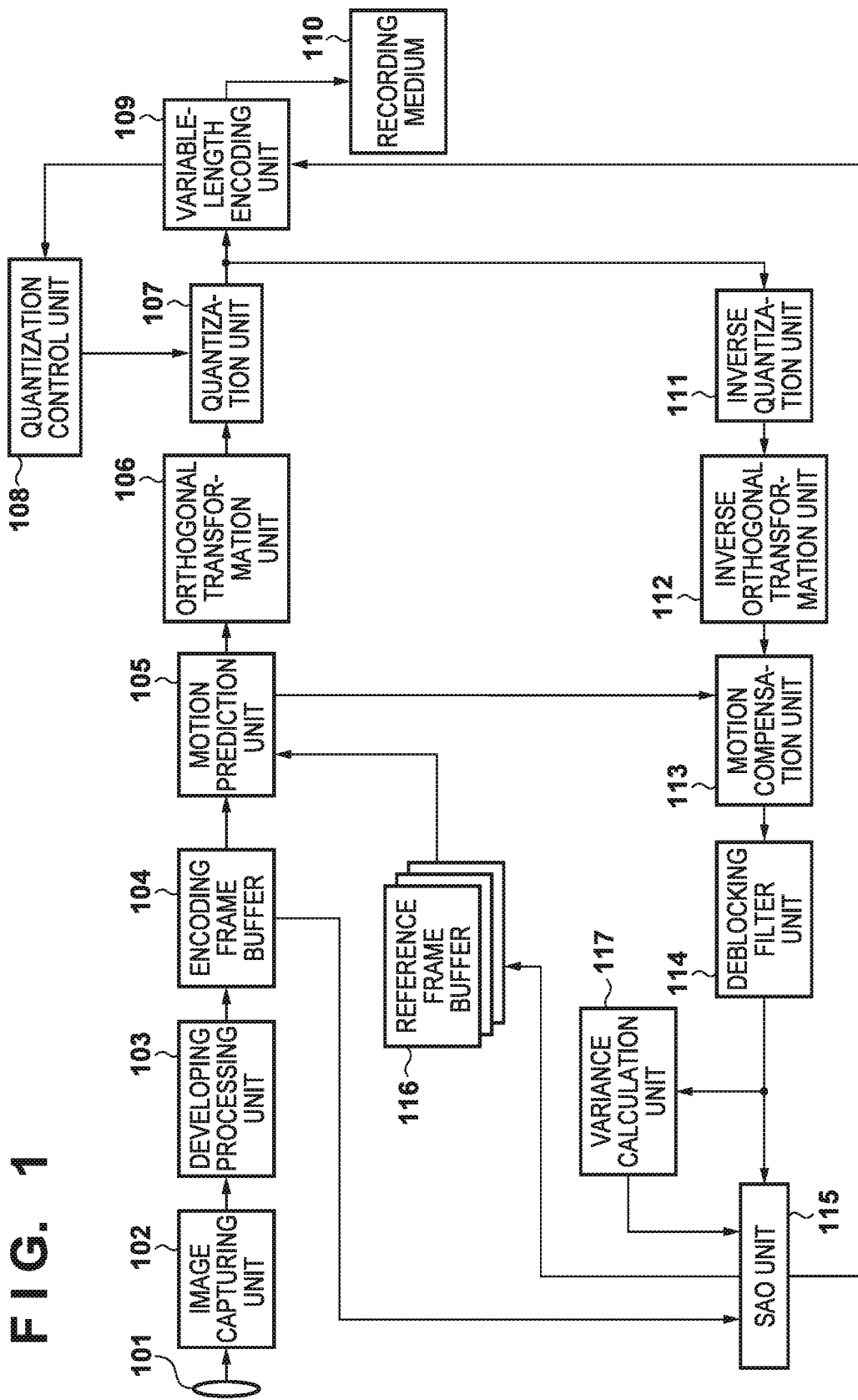
FIG. 1 is a block diagram showing an example of a camera system using an encoding apparatus according to the first embodiment of the present invention.

FIG. 1 is a block diagram showing an example of a camera system using a moving image encoding apparatus according to the first embodiment of the present invention. FIG. 1 shows an example of a moving image encoding apparatus which implements the HEVC scheme. In a camera system 100 in FIG. 1, each block of the moving image encoding apparatus, except for at least physical devices such as a lens, an image sensor, and a recoding medium, may be implemented in the form of hardware by using a dedicated logic circuit or memory. Alternatively, each block may be implemented in the form of software by causing a computer such as a CPU to execute a processing program stored in a memory.

The operation of the camera system according to the embodiment of the present invention will be described by referring to each constituent element shown in FIG. 1. First of all, reflected light from an object passes through a lens 101 and enters an image sensor such as a CCD or CMOS of an image capturing unit 102, thereby capturing an object image. The image capturing unit 102 generates a digital image by converting the analog pixel data of an analog image generated by image capturing pixels into digital pixel data, and outputs the digital image to a developing processing unit 103.

The developing processing unit 103 executes image processing such as de-Bayer processing, flaw correction, noise removal, enlargement/reduction processing, and color conversion to YCbCr with respect to the input digital image. The developing processing unit 103 provides an encoding frame buffer 104 with the digital image converted in a form allowing compression encoding after image processing. Assume that this image is an encoding target image.

The moving image encoding apparatus performs predictive encoding processing for the encoding target image. First of all, a motion prediction unit 105 detects motion vectors by performing block matching between an encoding target image stored in the encoding frame buffer 104 and a reference image stored in a reference frame buffer 116. The motion prediction unit 105 calculates pixel differences between the encoding target image and the prediction image generated based on the detected motion vectors and the reference image, and outputs the resultant difference image to an orthogonal transformation unit 106. In addition, the motion prediction unit 105 outputs the prediction image generated based on the motion vectors to a motion compensation unit 113 for the generation of a local decoded image.

The orthogonal transformation unit 106 performs discrete cosine transformation with respect to the sent difference image to generate transformation coefficients, and outputs them to a quantization unit 107. The quantization unit 107 performs quantization processing of the transformation coefficients sent from the orthogonal transformation unit 106 in accordance with a quantization step size output from a quantization control unit 108. The quantization unit 107 outputs the transformation coefficients obtained by the quantization processing to a variable-length encoding unit 109 to generate an encoded stream and to an inverse quantization unit 111 to generate a local decoded image. The variable-length encoding unit 109 performs variable-length encoding by performing zigzag scanning, alternate scanning, or the like with respect to the transformation coefficients after quantization processing which are obtained by the above predictive encoding processing. The variable-length encoding unit 109 generates an encoded stream by adding, to the transformation coefficients, information obtained by variable-length encoding of encoding scheme information such as motion vectors, a quantization step size, macroblock division information, and SAO parameters. The generated encoded stream is recorded on a recording medium 110.

In addition, the variable-length encoding unit 109 calculates a generated code amount for each macroblock when performing encoding, and outputs the generated code amounts to the quantization control unit 108. The quantization control unit 108 decides a quantization step size to obtain a target code amount by using the generated code amounts sent from the variable-length encoding unit 109, and outputs the quantization step size to the quantization unit 107.

Subsequently, decoding processing is performed based on the transformation coefficients after quantization which are obtained by predictive encoding processing. More specifically, the inverse quantization unit 111 generates transformation coefficients for local decoding by inversely quantizing the transformation coefficients after quantization which are sent from the quantization unit 107. The inverse quantization unit 111 outputs the transformation coefficients to an inverse orthogonal transformation unit 112. The inverse orthogonal transformation unit 112 generates a difference image by performing inverse discrete cosine transformation for the sent transformation coefficients. The inverse orthogonal transformation unit 112 outputs the generated difference image to the motion compensation unit 113. The motion compensation unit 113 generates decoded image data for local decoding by adding the prediction image at the motion vector position sent from the motion prediction unit 105 and the difference image sent from the inverse orthogonal transformation unit 112. The decoded image data generated by the above decoding processing is output to a deblocking filter unit 114.

The deblocking filter unit 114 applies deblocking filtering to the decoded image data to suppress the occurrence of noise on block boundaries. The image after deblocking filtering is output to an SAO unit 115. This image is also output to a variance calculation unit 117 for variance calculation. The variance calculation unit 117 calculates a variance value of the input image on a processing target block basis. A variance value is an index indicating how the magnitudes of pixel values vary. Flatter graphic patterns tend to exhibit smaller variance values, and vice versa. Assume that there are L×L blocks from which variance values are to be calculated, and the pixel values are represented by $P_1$ to $P_{L \times L}$. In this case, a mean value $P_{mean}$ of pixels and a variance value var of the pixels are calculated by equations (1) and (2) given below:

$$P_{mean} = \frac{1}{L \times L} \times \sum_{k=1}^{L \times L} P_k \quad (1)$$

-continued $$\text{var} = \frac{1}{L \times L} \times \sum_{k=1}^{L \times L} (P_k - P_{mean})^2 \qquad (2)$$

Assume that each block as a processing target for the calculation of a variance value has the same size as that of each CTU, and the block size is 64×64. In this case, it is possible to calculate a variance value by substituting L=64 into equations (1) and (2). Each calculated variance value is output to the SAO unit 115.

The SAO unit 115 selects to perform a band offset processing or edge offset processing or to perform nothing, and decides band positions, edge directions, offset values, and the like for SAO. The details of SAO will be described later.

The SAO unit 115 stores, in the reference frame buffer 116, an image obtained by performing SAO for the image after deblocking filtering as a local decoded image. The SAO unit 115 outputs parameters for SAO, such as information indicating which process is selected as SAO, band positions, edge directions, and offset values, to the variable-length encoding unit 109 to generate them as an encoded stream. With this operation, an encoded stream and a local decoded image are generated.

The details of SAO will be described next. SAO in the HEVC scheme includes a band offset processing and an edge offset processing. In general, a band offset processing is said to be effective for a flat portion with small changes in pixel value (an image with many low-frequency components). An edge offset processing is said to be effective for a portion susceptible to mosquito noise (an image with many high-frequency components), such as an edge portion exhibiting a large change in pixel value.

These processes can use only one of a band offset processing and an edge offset processing as SAO for each CTU in accordance with the feature of an image. That is, when an image of a CTU has a feature associated with a low-frequency component image, a band offset processing for a low-frequency component image is selected. If an image of a CTU does not have a feature associated with a low-frequency component image, an edge offset processing for a high-frequency component image is selected. Alternatively, it is possible to select to perform no SAO for each CUT. It is possible to independently perform SAO for luminance data and color difference data. In this case, SAO is performed for both luminance data and color difference data on the assumption that 1 pixel is constituted by 8 bits, and pixel values take values in the range of 0 to 255. Assume also that SAO is performed as a color difference process after a luminance process, and all the subsequent operations will be described as operations associated with luminances.

A band offset processing will be described. In a band offset processing, the range of pixel values 0 to 255 is divided into a plurality of bands for every 8 pixel values, a starting band position to which an offset is added is designated, a predetermined number (four corresponding to four bands) of offset values from the designated starting position are designated, and the designated offset values are respectively added to pixels of pixel values corresponding to the designated band positions. Assume that a method of designating band positions is represented by equation (3) given below.

$$\text{band position} = \text{pixel value}/8 \qquad (3)$$

That is, for pixel values 0 to 7, band position=0, and for pixel values 8 to 15, band position=1. Subsequently, for pixel values 16 to 255, band positions shift by 8 at a time. Band positions at which offset values can be designated correspond to 4 bands from a designated band position. If a designated band position is BP, offset values at four band positions, namely BP, BP+1, PB+2, and BP+3, can be designated. Assume that the offset value at the band position BP is OFF0, the offset value at the band position BP+1 is OFF1, the offset value at the band position BP+2 is OFF2, and the offset value at the band position BP+3 is OFF3. If the pixel value of a pixel before SAO corresponds to any one of the band positions BP, BP+1, BP+2, and BP+3, the offset value at the corresponding band position is added, thereby generating an image after the band offset processing.

Figure 2:
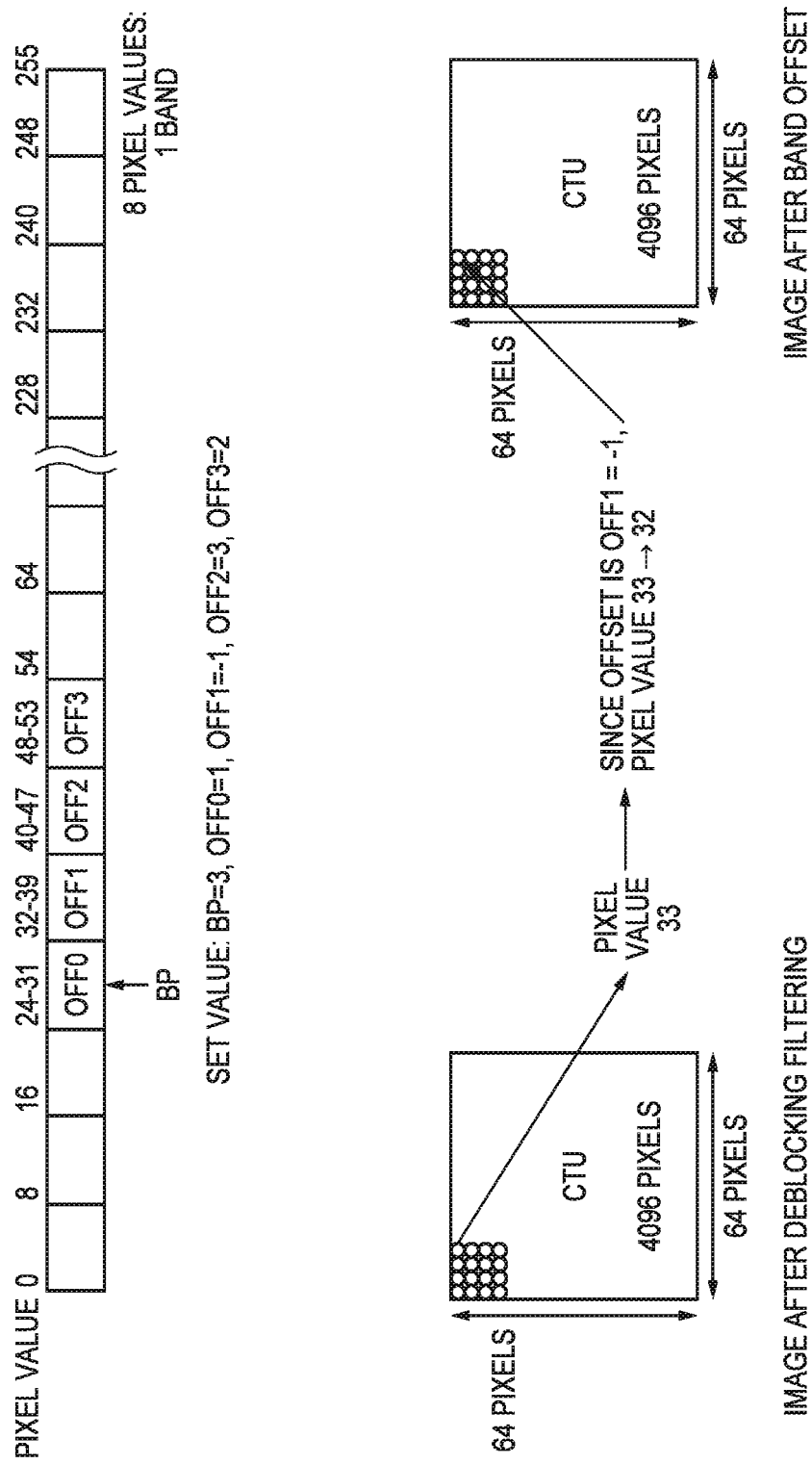
FIG. 2 is a view for explaining an example of a band offset processing according to the embodiment of the present invention.

An example of a band offset processing will be described next with reference to FIG. 2. In this case, BP=3, that is, pixel values 24 to 31 are designated as a band position for band offset. In addition, as offset values, OFF0=1, OFF1=−1, OFF2=3, and OFF3=2 are designated. This indicates that offset value 1 is designated for pixel values 24 to 31, offset value −1 is designated for pixel values 32 to 39, offset value 3 is designated for pixel values 40 to 47, and offset value 2 is designated for pixel values 48 to 55. For example, if a pixel before SAO has a value of 33, since the offset value is −1, the pixel value is changed to 33−1=32. Pixel values are checked with respect to all the pixels in a CTU in the same manner, and designated offset values are added to the pixel values of pixels corresponding to designated band positions. The pixel values of pixels which do not correspond to the designated band positions are not changed. In this manner, the band offset processing is completed.

An edge offset processing will be described next. An edge offset processing is classified into four categories based on the magnitude relationship between a target pixel (attention pixel) to be processed and three adjacent pixels, and an offset value is added for each category. Edge directions which designate the directions of adjacent pixels are designated, and offset values are respectively designated for the four categories. Edge directions will be described with reference to FIG. 3. Let C be a target pixel in an edge offset processing, and N be an adjacent pixel in the edge direction. One of four edge directions, namely a lateral direction, a longitudinal direction, oblique direction 1, and oblique direction 2 respectively denoted by reference numerals 301 to 304 in FIG. 3, is designated.

Categories will be described with reference to FIG. 4. Categories are decided based on the magnitude relationship between the pixel values of a total of three pixels, namely the target pixel C for an edge offset processing and the two adjacent pixels N with respect to a designated edge direction. If the both adjacent pixels N are larger than the target pixel C, category 1 denoted by reference numeral 401 is decided. If one of the adjacent pixels N has the same pixel value as that of the target pixel C and the other of the adjacent pixels N is larger than the target pixel C, category 2 denoted by reference numeral 402 is decided. If one of the adjacent pixels N has the same pixel value as that of the target pixel C and the other of the adjacent pixels N is smaller than the target pixel C, category 3 denoted by reference numeral 403 is decided. If the both adjacent pixels N are smaller than the target pixel C, category 4 denoted by reference numeral 404 is decided. Offset values are respectively designated for the four categories decided in this manner.

When a pixel before SAO belongs to one of the four categories based on the magnitude relationship between three pixels including the adjacent pixels in a designated edge direction, an offset value designated with respect to the category is added to generate an image after an edge offset processing. If this pixel does not belong to any of these four categories, the target pixel is excepted from the application of the edge offset processing. In this manner, the edge offset processing is completed.

SAO at the time of encoding will be described. At the time of encoding, encoding determination processing is performed to determine to perform a band offset processing or edge offset processing as SAO or to perform no SAO. SAO is performed for the image after deblocking filtering in accordance with this determination result to generate a local decoded image. This encoding determination processing is performed for each CTU.

The operation of the SAO unit 115 according to this embodiment will be described next. The SAO unit 115 performs encoding determination processing upon selecting only one of a band offset processing and an edge offset processing in accordance with a variance value output from the variance calculation unit 117. In general, a band offset processing is said to be effective for an image of a flat portion with small changes in pixel value. By using this characteristic, when an SAO target block is a flat block, only encoding determination processing is performed to determine whether to perform a band offset processing. If a processing target block is not a flat block, only encoding determination processing is performed to determine whether to perform an edge offset processing.

The SAO unit 115 uses a variance value output from the variance calculation unit 117 on a block basis to determine whether an SAO target block is a flat portion. If a variance value is small, the SAO unit 115 determines that the block is a flat portion. If var<α, where α is a predetermined threshold and var is a variance value, the SAO unit 115 determines that the block is a flat portion. Upon determining by using the variance value that the block is a flat portion, the SAO unit 115 performs encoding determination processing to determine whether to perform a band offset processing. Upon determining that the block is not a flat portion, the SAO unit 115 performs encoding determination processing to determine whether to perform an edge offset processing.

In this manner, in this embodiment, when processing a flat portion for which a band offset processing is expected to be highly effective, the SAO unit 115 performs encoding determination processing for only a band offset processing. Otherwise, the SAO unit 115 performs encoding determination processing for only an edge offset processing. This makes it possible to reduce the processing amount while performing appropriate determination processing for SAO.

Encoding determination processing for a band offset processing will be described. First of all, the SAO unit 115 decides band positions to which band offset is applied and offset values. Thereafter, the SAO unit 115 performs encoding determination processing to determine whether to perform a band offset processing. Note that the method described here is merely an example, and a method of deciding parameters and a method of determining whether to perform a band offset processing are not limited to those described here.

Figure 5:
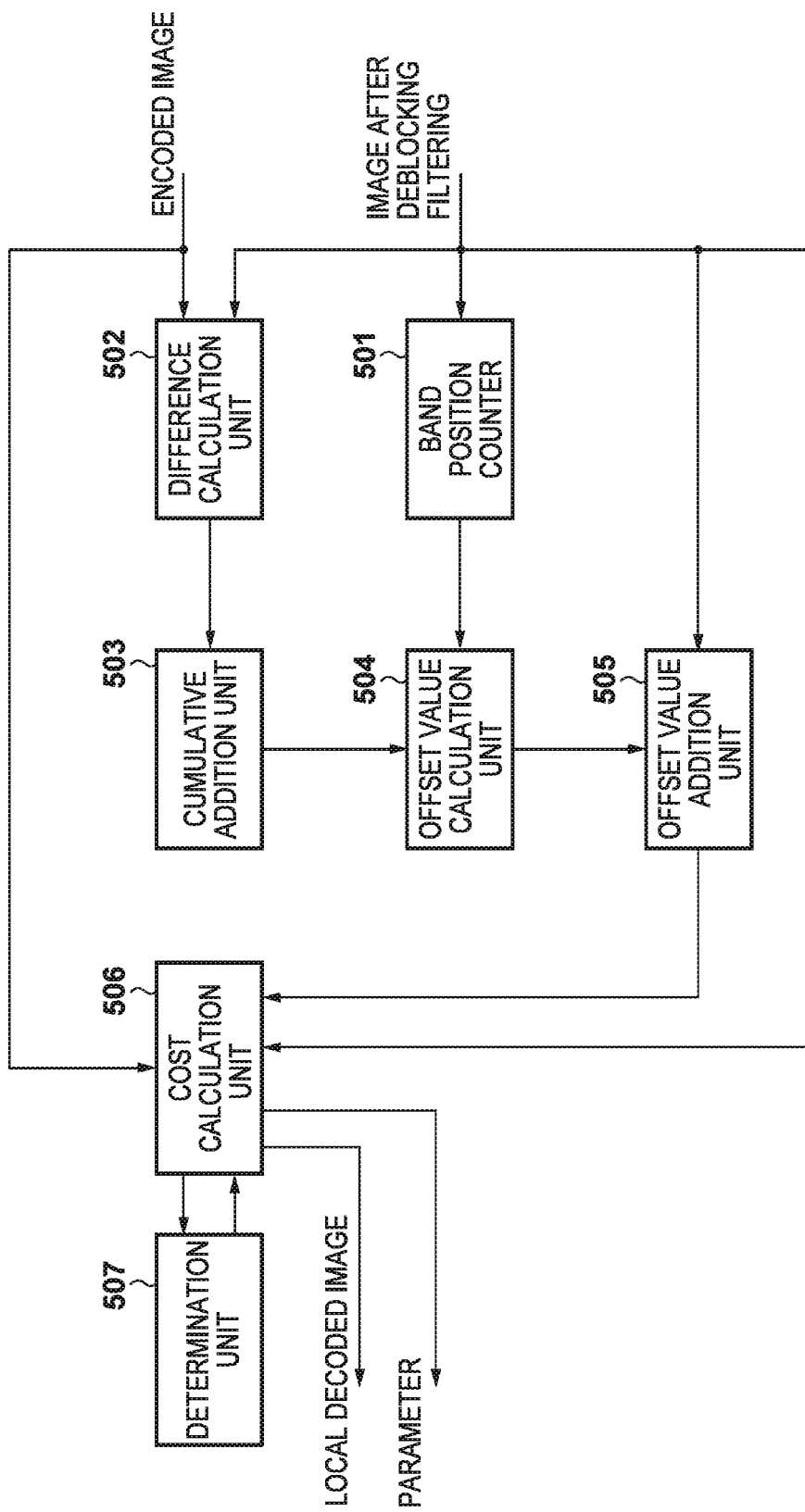
FIG. 5 is a functional block diagram showing an example of the functional arrangement of a band offset processing unit according to the embodiment of the present invention.

An example of a method of deciding parameters (offset values) for a band offset processing at the time of encoding and an example of encoding determination processing will be described with reference to FIG. 5. FIG. 5 is a block diagram showing an example of the functional arrangement of the SAO unit 115 when it functions as a band offset processing unit. Note that the functional block diagram of FIG. 5 can also be referred to as a flowchart showing a processing procedure in the SAO unit 115. In this case, each functional block in FIG. 5 is interpreted as a block representing a processing step executed in the SAO unit 115.

According to the method of deciding offset values shown in FIG. 5, the mean difference value between an image after deblocking filtering at each band position and an encoding target image is used an offset value. A method of deciding band positions is performed as follows. Cost calculation is performed based on the sum of absolute difference values between an image after the application of band offset at all band positions and an encoding target image. A band position at which the cost is minimum is used as a band position for band offset. Since parameters for SAO are encoded for each CTU, parameter decision processing and encoding determination processing are performed on a CTU basis.

First of all, an offset value is calculated at each band position. A band position counter 501 includes a counter at each band position, checks to which band position an image after deblocking filtering corresponds for each pixel, and counts the number of pixels belonging to each band position. The band position counter 501 outputs the number of pixels at each band position to an offset value calculation unit 504. A difference calculation unit 502 checks to which band position an image after deblocking filtering corresponds for each pixel, calculates the difference between the image after deblocking filtering and the encoding target image for each pixel, and outputs sets of band positions and difference values to a cumulative addition unit 503.

The cumulative addition unit 503 performs cumulative addition processing of difference values corresponding to each band position, and outputs a cumulative addition value at each band position to the offset value calculation unit 504. The offset value calculation unit 504 calculates a mean difference value per pixel by dividing a cumulative addition value at each band position by the number of pixels. This value is decided as an offset value at the band position. The offset value at each band position is output to an offset value addition unit 505. Cost calculation is then performed after the application of band offset at all the band positions. The offset value addition unit 505 performs a band offset processing at the starting band position designated with respect to the image after deblocking filtering. Addition processing is performed with respect to pixel values corresponding to four bands from the designated starting band position by using offset values decided by the offset value calculation unit 504. The offset value addition unit 505 outputs the image after offset addition to a cost calculation unit 506.

The cost calculation unit 506 calculates the sum of absolute difference values between all the pixels of the image after offset addition and those of the encoding target image, and sets the resultant value as a cost at the starting band position. The offset value addition unit 505 and the cost calculation unit 506 respectively perform offset addition processing and cost calculation at all the starting band positions, thereby deciding a starting band position exhibiting the lowest cost as a band position for band offset. In this manner, band positions, offset values, and corresponding costs in a band offset processing are decided. The costs are sent to a determination unit 507. The cost calculation unit 506 also calculates a cost when no band offset processing is performed. The cost calculation unit 506 calculates the sum of absolute difference values between all the pixels of the image after deblocking filtering and those of the encoding target image, and sets the resultant value as a cost when no band offset processing is performed. This cost is also sent to the determination unit 507.

The determination unit 507 performs encoding determination processing to determine whether to perform a band offset processing. First of all, the determination unit 507 calculates an image quality improvement cost as an index indicating how much image quality is improved by performing a band offset processing. This cost is obtained by subtracting a cost obtained upon execution of a band offset processing from a cost obtained without execution of a band offset processing. When performing a band offset processing, it is necessary to encode band positions and offset values. It is possible to determine whether to perform a band offset processing, depending on whether an increase in code amount can achieve a further improvement in image quality. If a cost without execution of a band offset processing is low from the beginning, an improvement effect is low because of a low image quality improvement cost. In contrast to this, if a cost is high when no band offset processing is performed, the image quality improvement cost becomes high, and hence a high improvement effect can be expected. Since an increase in code amount is almost constant, if an image quality improvement cost is equal to or more than a predetermined value, it is possible to determine that the image quality improvement effect is high. The determination unit 507 determines to perform a band offset if an image quality improvement cost is equal to or more than the predetermined value, and determines not to perform a band offset processing if the image quality improvement cost is lower than the predetermined value.

The determination unit 507 sends the determination result to the cost calculation unit 506. The cost calculation unit 506 outputs encoding parameters and a local decoded image in accordance with the determination result.

If the determination result indicates that no band offset processing is performed, a flag indicating that no SAO is performed is output as an encoding parameter. In addition, an image after deblocking filtering is output as a local decoded image. If the determination result indicates that a band offset processing is performed, a flag indicating that a band offset processing is performed, band positions, and offset values corresponding to four bands are output as encoding parameters. In addition, an image obtained by performing a band offset processing for an image after deblocking filtering is output as a local decoded image.

In the above manner, it is possible to decide band positions and offset values as parameters for a band offset processing. In addition, it is possible to determine whether to perform a band offset processing.

Figure 6:
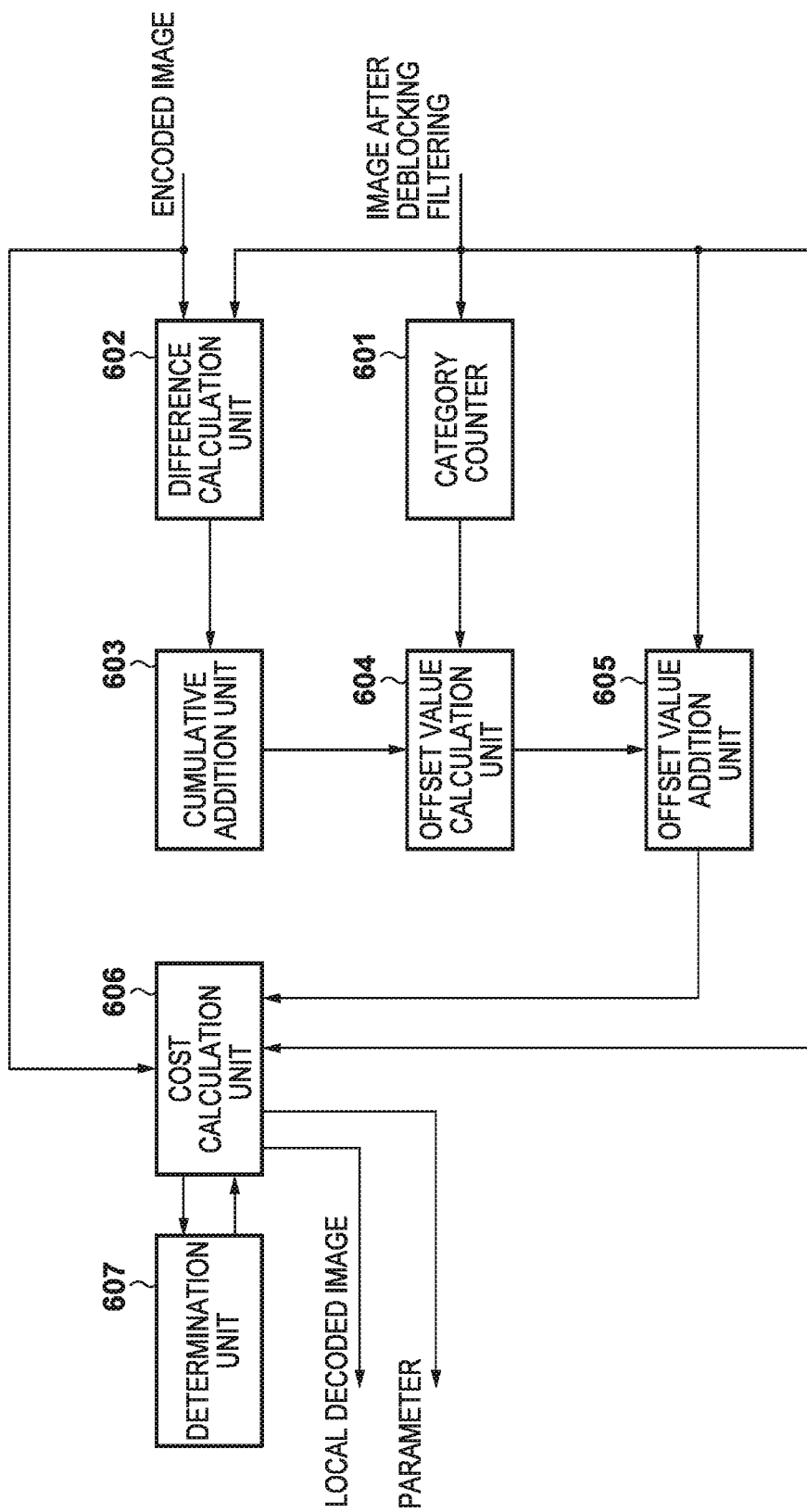
FIG. 6 is a functional block diagram showing an example of the functional arrangement of an edge offset processing unit according to the embodiment of the present invention.

Encoding determination processing for an edge offset processing will be described next. First of all, edge directions to which edge offset is applied and offset values are decided. Thereafter, encoding determination processing is performed to determine whether to perform an edge offset processing. Various methods are conceivable as methods of deciding these parameters and methods of determining whether to perform an edge offset processing. An example of a parameter decision method for an edge offset processing at the time of encoding and an example of encoding determination processing will be described with reference to FIG. 6. FIG. 6 is a block diagram showing an example of the functional arrangement of the SAO unit 115 when it functions as an edge offset processing unit. Note that the functional block diagram of FIG. 6 can also be referred to as a flowchart showing a processing procedure in the SAO unit 115. In this case, each functional block in FIG. 6 is interpreted as a block representing a processing step executed in the SAO unit 115.

The offset value decision method uses a means difference value between an image after deblocking filtering and an encoding target image for each direction and each category as an offset value. The edge direction decision method performs cost calculation based on the sums of absolute difference values between an image after the application of edge offset and the encoding target image in all the edge directions, and uses an edge direction corresponding to the lowest cost as an edge direction for edge offset.

First of all, an offset value is calculated for each edge direction and each category. A category counter 601 has a counter for each category in each edge direction. The category counter 601 includes counters corresponding to the four categories in FIG. 4 in the respective four edge directions in FIG. 3. The category counter 601 checks to which category each pixel of an image after deblocking filter corresponds in all the four edge directions, and counts the number of pixels belonging to each category. The number of pixels for each edge direction and each category is output to an offset value calculation unit 604.

A difference calculation unit 602 checks to which category in each edge direction each pixel of the image after deblocking filtering corresponds. The difference calculation unit 602 also calculates the difference between the image after the deblocking filtering and the encoding target image for each pixel, and outputs sets of edge directions, categories, and difference values to a cumulative addition unit 603. The cumulative addition unit 603 performs cumulative addition processing of difference values corresponding to the respective categories in the respective edge directions, and outputs a cumulative addition value for each category in each edge direction to the offset value calculation unit 604. The offset value calculation unit 604 calculates a means difference value per pixel by dividing the cumulative addition value for each category in each edge direction by the number of pixels. The offset value calculation unit 604 decides this value as an offset value for each category in each edge direction. The offset value calculation unit 604 outputs the offset value for each category in each edge direction to an offset value addition unit 605.

Cost calculation is performed after the application of edge offset in all edge directions. The offset value addition unit 605 performs an edge offset processing in a designated edge direction with respect to an image after deblocking filtering. Addition processing is performed with respect to a pixel value corresponding to each category in the designated edge direction by using an offset value decided by the offset value calculation unit 604. The image after offset addition is output to a cost calculation unit 606.

The cost calculation unit 606 calculates the sum of absolute difference values between all the pixels of the image after the offset addition and those of the encoding target image, and sets the resultant value as a cost in the edge direction. The offset value addition unit 605 and the cost calculation unit 606 respectively perform offset addition processing and cost calculation in all the edge directions, and decide an edge direction corresponding to the lowest cost as an edge direction for edge offset. In this manner, edge directions, offset values, and the corresponding costs for an edge offset processing are decided. The costs are sent to a determination unit 607.

The cost calculation unit 606 also performs cost calculation without any edge offset processing. The cost calculation unit 606 calculates the sum of absolute difference values between all the pixels of the image after deblocking filtering and those of the encoding target image, and sets the resultant value as a cost without any edge offset processing. This cost is also sent to the determination unit 607.

The determination unit 607 performs encoding determination processing to determine whether to perform an edge offset processing. First of all, the determination unit 607 calculates an image quality improvement cost as an index indicating how much the image quality is improved when an edge offset processing is performed. This cost is obtained by subtracting a cost obtained upon execution of an edge offset processing from a cost obtained without any edge offset processing.

When performing an edge offset processing, it is necessary to encode edge directions and offset values. It is possible to determine whether to perform an edge offset processing, depending on whether an increase in code amount can achieve a further improvement in image quality. If a cost without execution of an edge offset processing is low from the beginning, an improvement effect is low because of a low image quality improvement cost. In contrast to this, if a cost is high when no edge offset processing is performed, the image quality improvement cost becomes high, and hence a high improvement effect can be expected. Since an increase in code amount is almost constant, if an image quality improvement cost is equal to or more than a predetermined threshold, it is possible to determine that the image quality improvement effect is high. The determination unit 607 determines to perform an edge offset processing if an image quality improvement cost is equal to or more than the predetermined value, and determines not to perform an edge offset processing if the image quality improvement cost is lower than the predetermined value.

The determination unit 607 sends the determination result to the cost calculation unit 606. The cost calculation unit 606 outputs encoding parameters and a local decoded image in accordance with the determination result. If the determination result indicates that no edge offset processing is performed, a flag indicating that no SAO is performed is output as an encoding parameter. In addition, an image after deblocking filtering is output as a local decoded image. If the determination result indicates that an edge offset processing is performed, a flag indicating that an edge offset processing is performed, edge directions, and offset values corresponding to the respective categories are output as encoding parameters. In addition, an image obtained by performing an edge offset processing for an image after deblocking filtering is output as a local decoded image.

In the above manner, it is possible to decide edge directions and offset values as parameters for an edge offset processing. In addition, it is possible to determine whether to perform an edge offset processing. Note that a method of deciding parameters for an edge offset processing and a method of determining whether to perform an edge offset processing are not limited to those described above, and any methods can be used.

As described above, this embodiment is configured to obtain the variance value of the pixels of a block as an SAO target after deblocking filtering and perform only one of encoding determination processing for a band offset processing and encoding determination processing for an edge offset processing in accordance with the variance value. Encoding determination processing for a band offset processing is performed with respect to a flat portion for which a band offset processing is effective; otherwise, encoding determination processing for an edge offset processing is performed. This makes it possible to reduce the processing amount without impairing the effect of SAO. Although this embodiment has exemplified the HEVC scheme, the present invention can be applied to any encoding scheme as long as it performs SAO.

Second Embodiment

The second embodiment of the present invention will be described next. In general, when encoding a moving image, adaptive quantization control is often performed to improve subjective image quality. In this case, the features of an image are extracted, and control is performed to adaptively change a quantization step size for a portion where deterioration is not visually noticeable and a portion where deterioration is visually noticeable. As one of parameters representing the features of an image, the block-based variance value of an encoding target image is generally used. This embodiment therefore will exemplify a case in which a system using a variance value of an encoding target image as a parameter representing a feature of the image also uses the variance value for SAO.

Figure 7:
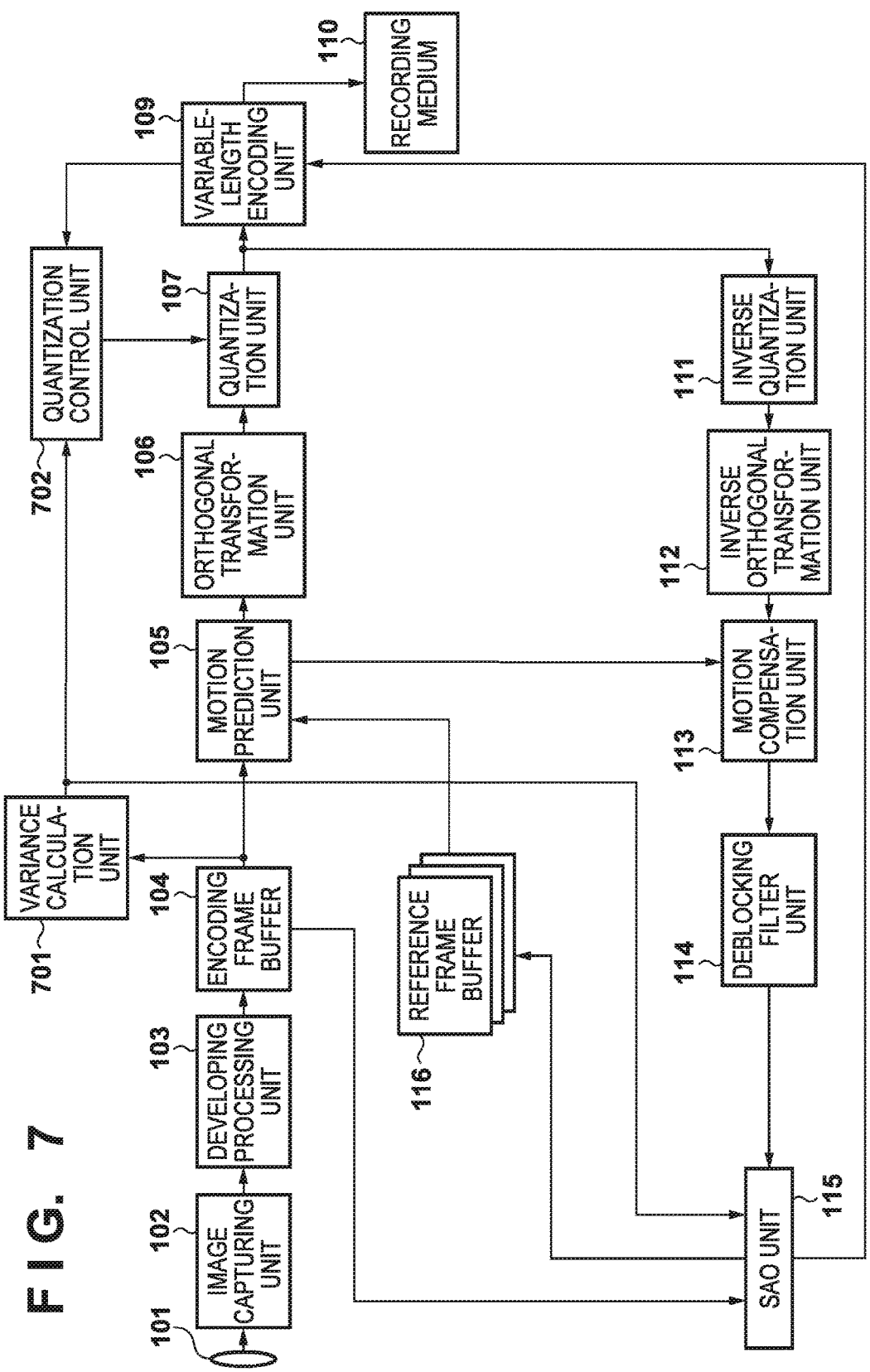
FIG. 7 is a block diagram showing an example of a camera system using an encoding apparatus according to the second embodiment of the present invention.

This embodiment is featured in that the variance value of a target block in SAO is calculated from the pixels of an encoding target image which is to be encoded instead of being calculated from pixels after deblocking filtering. FIG. 7 is a block diagram showing the arrangement of a camera system using a moving image encoding apparatus according to the embodiment. Only differences from the first embodiment will be described in detail below. Referring to FIG. 1, the variance calculation unit 117 is arranged in the subsequent stage of the deblocking filter unit 114. In contrast to this, referring to FIG. 7, a variance calculation unit 701 is arranged in the subsequent stage of an encoding frame buffer. This allows the variance calculation unit 701 to function both as a variance value calculation unit for adaptive quantization control and a variance value calculation unit for encoding determination for SAO. It is therefore possible to suppress a circuit size.

Referring to FIG. 7, the variance calculation unit 701 obtains an encoding target image on a block basis from an encoding frame buffer 104. The variance calculation unit 701 calculates a variance value on a block basis by using equations (1) and (2) in the first embodiment. Each block from which a variance value is to be calculated corresponds to, for example, a CTU size. Each calculated variance value is sent to a quantization control unit 702 and an SAO unit 115. The quantization control unit 702 changes a quantization step size in accordance with a variance value output from the variance calculation unit 701. For example, when a variance value is small, a quantization step size is reduced, and vice versa. The SAO unit 115 performs encoding determination processing upon selecting only one of a band offset processing and an edge offset processing as in the first embodiment in accordance with a variance value output from the variance calculation unit 701. After encoding processing, the local decoded image has deteriorated relative to the encoding target image but remains its feature, that is, being a flat portion. This makes it possible to determine that a local decoded image after deblocking filtering, which is an SAO target image, is a flat portion.

As described above, this embodiment can suppress a circuit size by letting one variance calculation unit function both as a variance value calculation unit for adaptive quantization control and a variance value calculation unit for encoding determination for SAO. In addition, like the first embodiment, the second embodiment can reduce the processing amount while performing determination processing for SAO by performing encoding determination processing for only a band offset processing when processing a flat portion for which a band offset processing is expected to be highly effective; otherwise, performing encoding determination processing for only an edge offset processing.

Third Embodiment

The third embodiment of the present invention will be described next. The first and second embodiments have exemplified the case in which the variance value of an image is used as a feature parameter of the image which is used to determine whether to execute either of a band offset processing and an edge offset processing. In contrast to this, the third embodiment is configured to obtain the number of pixels at each band position after deblocking filtering of a block as a target for SAO and calculate a band position at which the number of pixels in a predetermined number of consecutive bands (four bands) is the largest and the number of pixels. In accordance with the number of pixels, then, only one of encoding determination processing for a band offset processing and encoding determination processing for an edge offset processing is performed.

Figure 8:
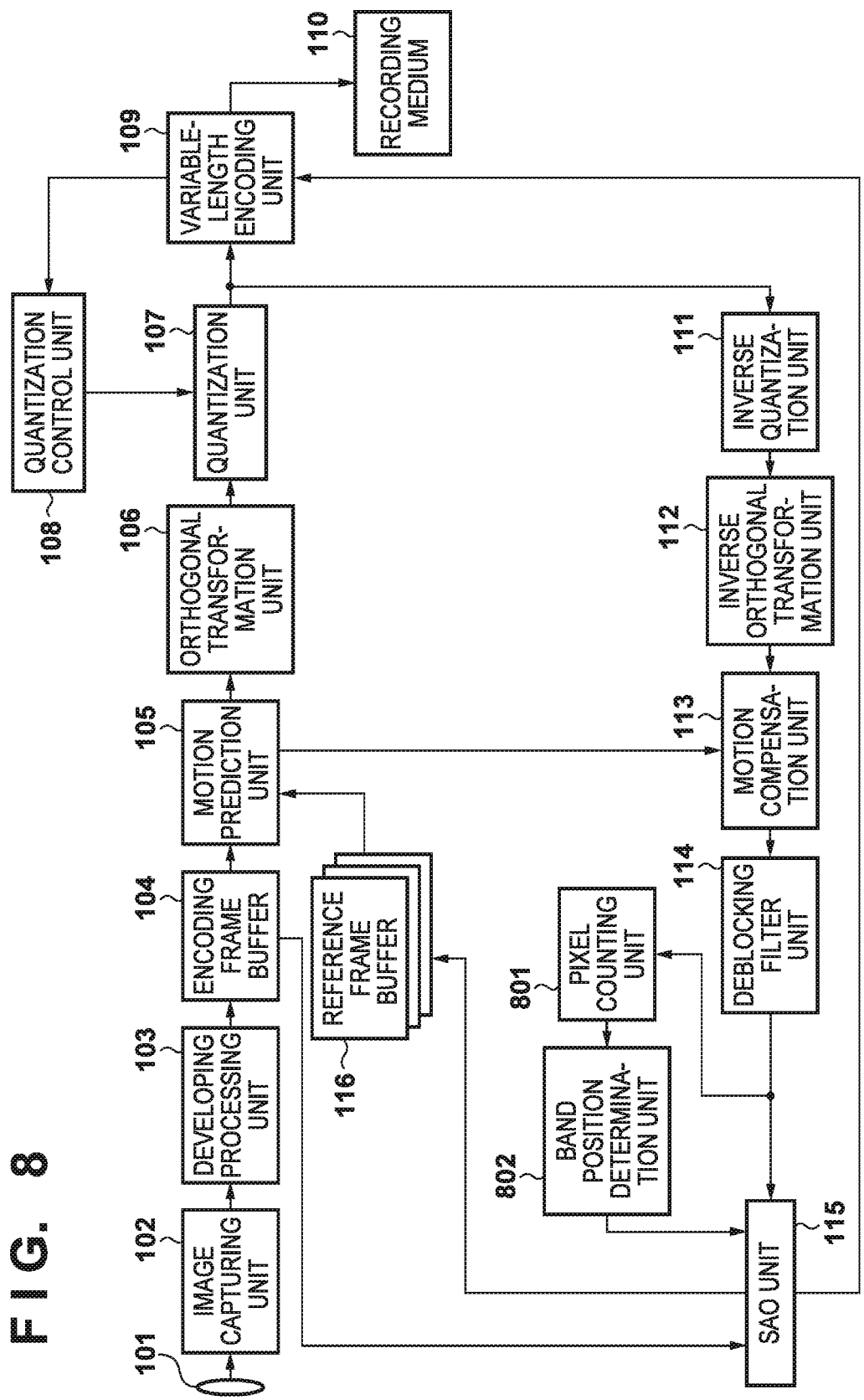
FIG. 8 is a block diagram showing an example of a camera system using an encoding apparatus according to the third embodiment of the present invention.

FIG. 8 is a block diagram showing the arrangement of a camera system using a moving image encoding apparatus according to this embodiment. Only differences from the first embodiment will be described in detail below. Referring to FIGS. 1 and 7, the moving image encoding apparatuses respectively include the variance calculation units 117 and 701. In contrast to this, in this embodiment, a pixel counting unit 801 and a band position determination unit 802 are arranged in the subsequent stage of a deblocking filter unit 114. The pixel counting unit 801 has a counter at each band position for a band offset processing, counts the number of pixels at each band position, and outputs the numbers of pixels to the band position determination unit 802. The band position determination unit 802 decides band positions in a band offset processing from the numbers of pixels at the respective band positions. In addition, it is decided to perform either encoding determination processing for a band offset processing or encoding determination processing for an edge offset processing.

Figure 9:
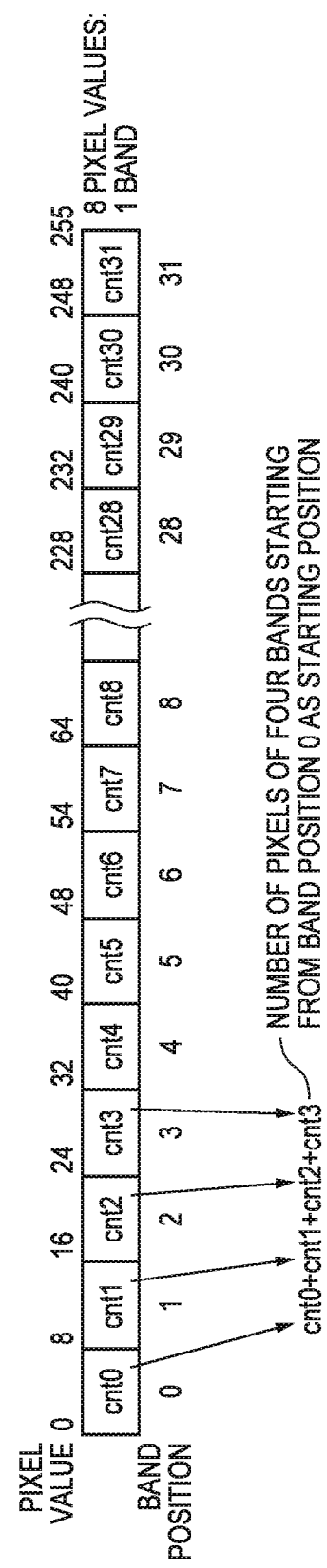
FIG. 9 is a view for explaining a method of counting the number of pixels at each band position according to the third embodiment of the present invention.
Figure 10:
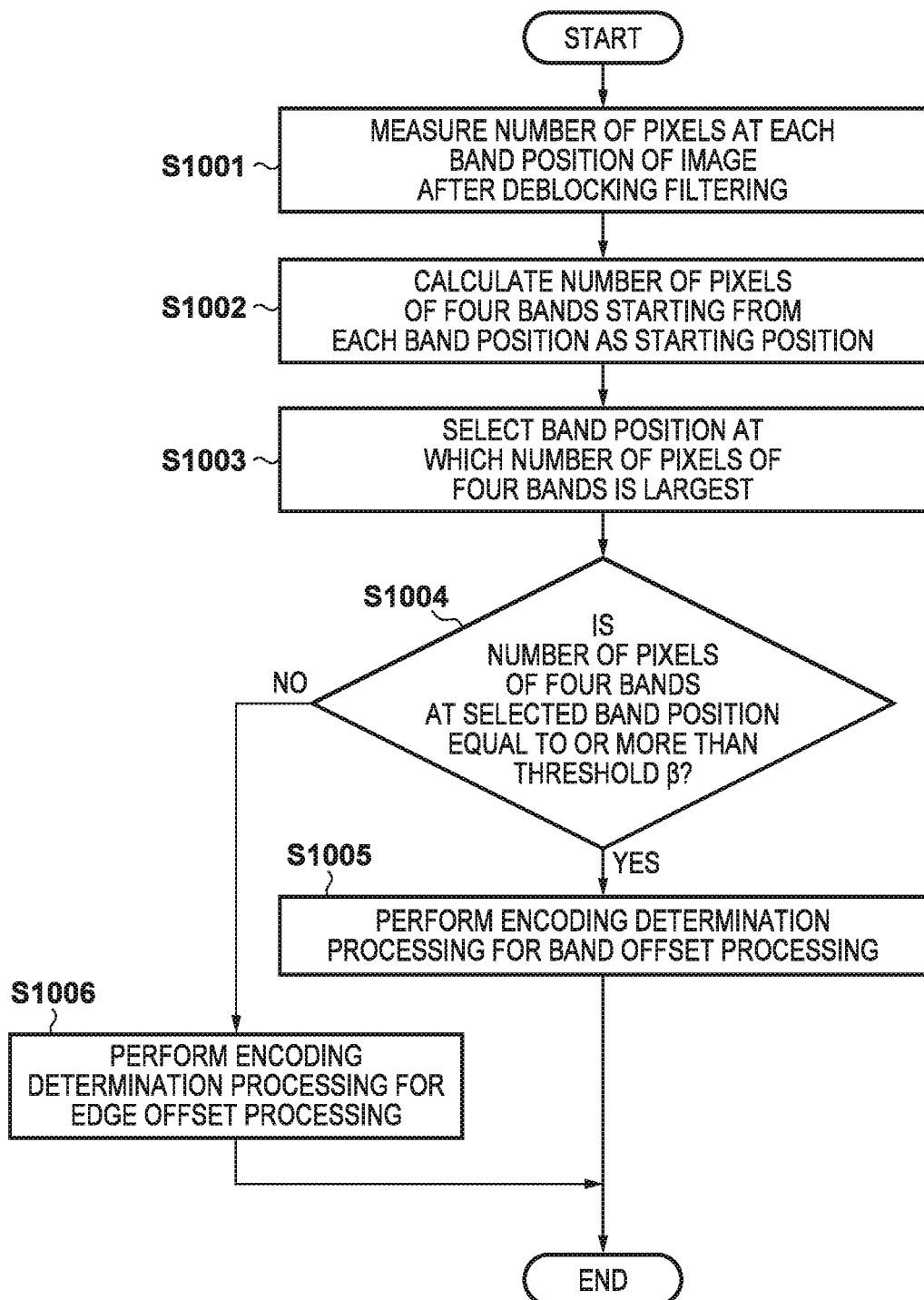
FIG. 10 is a flowchart showing an example of processing according to the third embodiment of the present invention.

The operations of the pixel counting unit 801 and the band position determination unit 802 will be described below with reference to FIGS. 9 and 10. FIG. 9 is a view showing an example of the number of pixels at each band position. FIG. 10 is a flowchart showing an example of the operations of the pixel counting unit 801, the band position determination unit 802, and the SAO unit 115.

In step S1001, the pixel counting unit 801 counts the number of pixels at each band position in a band offset processing on a CTU basis with respect to an image output from the deblocking filter unit 114 as a target for SAO. The pixel counting unit 801 includes 32 counters corresponding to band positions 0 to 31 represented by equation (3), determines the pixel value of each pixel of an image output from the deblocking filter unit 114, and counts up the counter at each band position. Upon completing the counting of all pixels of a CTU, the pixel counting unit 801 outputs the number of pixels at each band position to a band position determination unit 118.

In step S1002, the band position determination unit 802 calculates the number of pixels in four consecutive bands from the number of pixels at each band position. In step S1003, the band position determination unit 802 decides a band position, in the four bands, at which the number of pixels is the largest. An example of the number of pixels at each band position will be described with reference to FIG. 9. The numbers of pixels at band positions 0 to 31 are respectively represented by cnt0 to cnt31. The band position determination unit 802 calculates the number of pixels corresponding to consecutive four bands starting from each band position. For example, the number of pixels corresponding to four bands from band position 0 as a starting position is given as cnt0+cnt1+cnt2+cnt3. When a band position exceeds 31, a band position for the calculation of the number of pixels returns to band position 0. For example, when band position 30 is a starting position, the number of pixels corresponding to four bands is given as cnt30+cnt31+cnt0+cnt1.

The band position determination unit 802 selects a band position corresponding to the largest number of pixels among the numbers of pixels, each corresponding to four bands starting from each of band positions 0 to 31 calculated in the above manner as a starting position. The selected position is set at a band position in a band offset processing. According to the first and second embodiments, a band position at which the highest image quality improvement effect is obtained is selected from an image after band offset processings at all the band positions. In contrast to this, according to the third embodiment, the number of pixels is measured at each band position, and band positions are decided by only comparing the numbers of pixels. This makes it possible to reduce the processing amount.

The band position determination unit 802 then selects whether to perform encoding determination processing for a band offset processing or encoding determination processing for an edge offset processing based on the number of pixels corresponding to four bands starting from the selected band position as a starting position. The number of pixels corresponding to four bands starting from the selected band position as a starting position is the number of pixels subjected to a band offset processing. That is, as the number of pixels increases, the effect of a band offset processing can be expected to increase. When the number of pixels corresponding to the four bands is equal to or more than a threshold, the band position determination unit 802 performs encoding determination processing for a band offset processing. This threshold is given as β, and its value is decided in advance. The threshold β may be decided in advance to be, for example, 50% or more of the number of pixels of a CTU. If the CTU size is 64×64 pixels, and the threshold β is set to 50% of the CTU size, the threshold can be calculated according to equation (4) given below:

$$\beta = (64 \times 64) \times (50/100) = 2048 \qquad (4)$$

The band position determination unit 802 transfers the number of pixels corresponding to four consecutive bands starting from the selected band position as a starting position to an SAO unit 115. In step S1004, the SAO unit 115 discriminates whether the number of pixels corresponding to the four bands is equal to or more than the threshold β. If the number of pixels corresponding to the four bands is equal to or more than the threshold β, the SAO unit 115 executes encoding determination processing for a band offset processing in step S1005. In contrast to this, if the number of pixels corresponding to the four bands is smaller than the threshold β, the SAO unit 115 executes encoding determination processing for an edge offset processing in step S1006. Note that the details of a band offset processing and an edge offset processing are the same as those described above, and hence a description of them will be omitted. In the above manner, encoding determination processing for SAO is performed.

Encoding determination processing for a band offset processing according to this embodiment will be described next. The band position determination unit 118 has already decided band positions at which band offset is applied. Offset values to be applied in a band offset processing are decided first. Encoding determination processing is then performed to determine whether to perform a band offset processing.

An example of a method of deciding offset values for a band offset processing and an example of encoding determination processing will be described with reference to FIG. 5. The offset value decision method uses, as an offset value, the mean difference value between an image after deblocking filtering and a decoded image at each band position decided by the band position determination unit 118. First of all, an offset value at each band position is calculated. A band position counter 501 includes counters corresponding to four bands. The band position counter 501 checks, for each pixel, whether an image after deblocking filtering corresponds to the four bands starting from the decided band position as a starting position, and counts the number of pixels corresponding to each band position. The band position counter 501 outputs the number of pixels corresponding to each band position to an offset value calculation unit 504.

A difference calculation unit 502 checks whether an image after deblocking filtering corresponds to the four bands starting from the decided band position as a starting position, and calculates the differences between corresponding pixels of the image after deblocking filtering and those of the encoded image. The difference calculation unit 502 outputs sets of band positions and pixel difference values to a cumulative addition unit 503. The cumulative addition unit 503 performs cumulative addition processing of the difference values corresponding to each band position, and outputs a cumulative addition value at each band position to the offset value calculation unit 504. The offset value calculation unit 504 calculates a mean difference value per pixel by dividing the cumulative addition value at each band position by the number of pixels. This value is decided as an offset value at the band position. The offset value at each band position is output to an offset value addition unit 505.

Cost calculation is then performed after the application of band offset. The offset value addition unit 505 performs a band offset processing for the image after deblocking filtering. Addition processing is performed with respect to pixel values corresponding to four bands from the starting band position decided by the band position determination unit 118 by using offset values decided by the offset value calculation unit 504. The offset value addition unit 505 outputs the image after offset addition to a cost calculation unit 506. The cost calculation unit 506 calculates the sum of absolute difference values between all the pixels of the image after the offset addition and those of the encoded image, and sets the resultant value as a cost at the time of the application of band offset. In this manner, offset values for a band offset processing and corresponding costs are decided. The costs are sent to a determination unit 507.

The cost calculation unit 506 also calculates a cost when no band offset processing is performed as in the first embodiment. The calculated cost is sent to the determination unit 507. The determination unit 507 performs encoding determination processing to determine whether to perform a band offset processing. First of all, as in the first embodiment, the determination unit 507 calculates an image quality improvement cost. The determination unit 507 performs determination as follows. If the image quality improvement cost is equal to or more than a predetermined threshold, the determination unit 507 determines to perform a band offset processing. If the image quality improvement cost is less than the threshold, the determination unit 507 determines not to perform a band offset processing. The determination result is sent to the cost calculation unit 506. The cost calculation unit 506 outputs encoding parameters and a local decoded image in accordance with the determination result. If the determination result indicates that no band offset processing is performed, the cost calculation unit 506 outputs a flag as an encoding parameter indicating that no band offset processing is performed. In addition, the cost calculation unit 506 outputs an image after deblocking filtering as a local decoded image. If the determination result indicates that a band offset processing is performed, the cost calculation unit 506 outputs, as encoding parameters, a flag indicating that a band offset processing is performed, band positions, and offset values corresponding to four bands. The cost calculation unit 506 also outputs, as a local decoded image, an image obtained by applying a band offset processing to an image after deblocking filtering.

In the above manner, it is possible to decide offset values as parameters for a band offset processing. In addition, it is possible to determine whether to perform a band offset processing.

Encoding determination processing for an edge offset processing is the same as that in the first embodiment and can be executed in accordance with FIGS. 3, 4, and 6, and hence a detailed description of the processing will be omitted.

In the above manner, this embodiment is configured to obtain the number of pixels after deblocking filtering of an SAO target block at each band position and calculate a band position at which the number of pixels is the largest among the numbers of pixels in the consecutive four bands. In accordance with this number of pixels, only one of encoding determination processing for a band offset processing and encoding determination processing for an edge offset processing is performed.

This embodiment can reduce the processing amount while performing determination processing for SAO by performing encoding determination processing for only a band offset processing when pixels are concentrated on a given four-band portion, and a band offset processing is expected to produce a high effect; otherwise, performing encoding determination processing for only an edge offset processing. Although this embodiment has exemplified the HEVC scheme, the present invention can be applied to any encoding scheme as long as it performs SAO.

Fourth Embodiment

The fourth embodiment of the present invention will be described next. The third embodiment described above is configured to perform processing associated with the decision of band positions and encoding determination for a band offset processing based on the number of pixels at each band position. In contrast to this, the fourth embodiment uses the number of pixels at each band position for only the decision of band positions for a band offset processing and uses the variance values of an image, which are used in the first and second embodiments, for processing associated with encoding determination.

Figure 11:
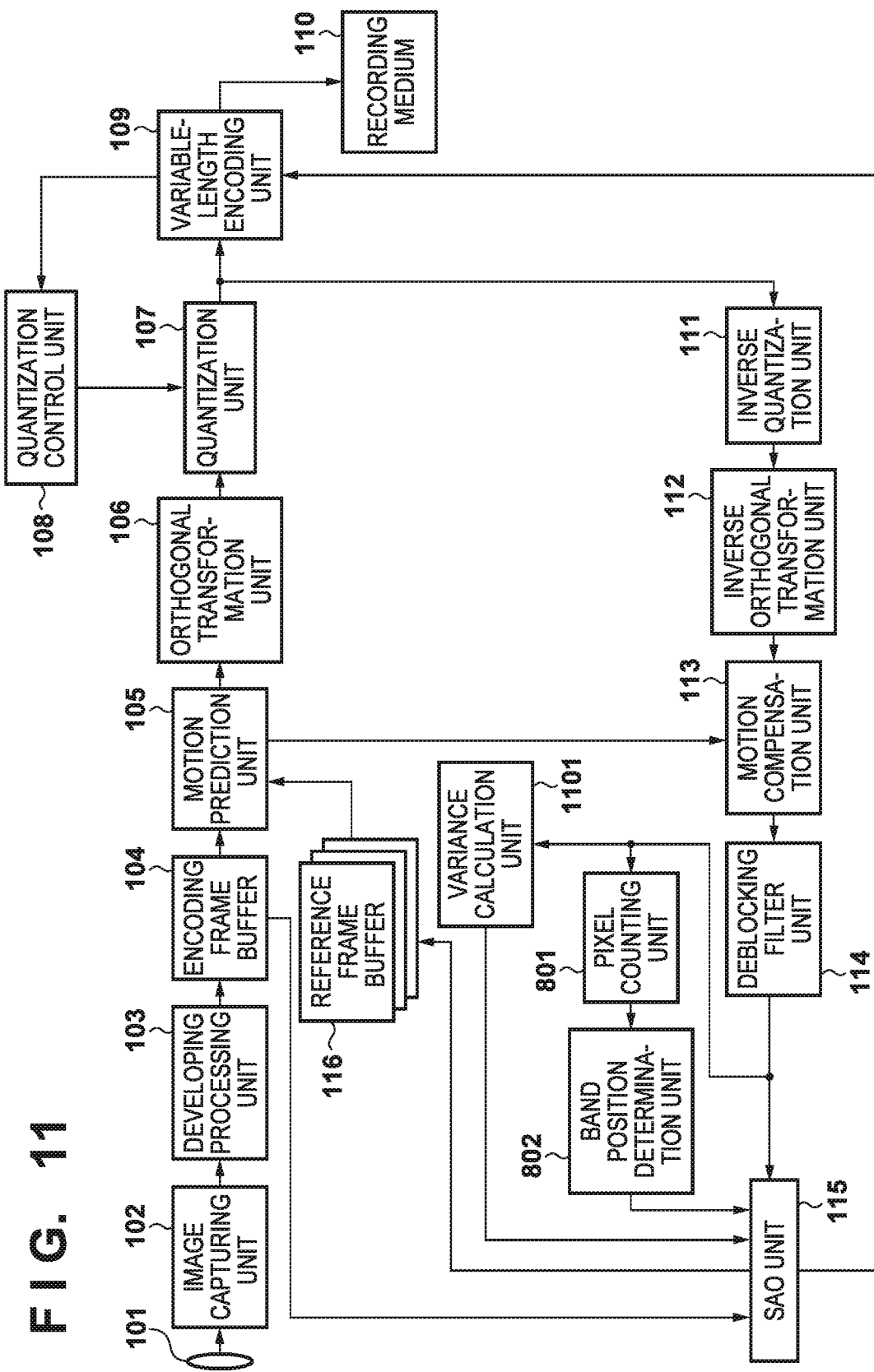
FIG. 11 is a block diagram showing an example of a camera system using an encoding apparatus according to the fourth embodiment of the present invention.

FIG. 11 is a block diagram showing the arrangement of a camera system using a moving image encoding apparatus according to this embodiment. Only differences from the third embodiment will be described in detail below. In the arrangement shown in FIG. 11, a variance calculation unit 1101 is further arranged in the subsequent stage of a deblocking filter unit 114. The variance calculation unit 1101 calculates the variance value of pixels after deblocking filtering, and an SAO unit 115 performs encoding determination processing upon selecting only one of a band offset processing and an edge offset processing in accordance with the variance value.

The details of a method of deciding band positions and encoding determination processing for a band offset processing and an edge offset processing in this embodiment are the same as those in third embodiment. The calculation of variance values and a method of selecting one of a band offset processing and an edge offset processing are the same as those in the first embodiment. A detailed description of them will therefore be omitted. Note that the variance calculation unit 1101 may be arranged behind an encoding frame buffer 104 as in the second embodiment. In this case, a quantization control unit 108 can use variance values for controlling a quantization step size.

As described above, this embodiment can reduce the processing amount while performing determination processing for SAO by performing, in accordance with the variance values of an image, encoding determination processing for only a band offset processing when processing a flat portion for which a band offset processing is expected to be highly effective; otherwise, performing encoding determination processing for only an edge offset processing. In addition, it is possible to reduce the processing amount by counting the number of pixels at each band position and deciding band positions by comparing the numbers of pixels.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-214801, filed Oct. 30, 2015, which is hereby incorporated by reference herein in its entirety.

What is claimed is:

1. A moving image encoding apparatus comprising:
an encoding unit configured to perform predictive encoding for an encoding target image on a block basis;
a decoding unit configured to generate a decoded image by decoding the target image having undergone the predictive encoding;
a filter unit configured to apply deblocking filtering to the decoded image; and
an offset processing unit configured to perform an offset processing for the decoded image having undergone the deblocking filtering,
wherein the encoding unit performs the predictive encoding based on the decoded image having undergone the offset processing by the offset processing unit,
wherein the offset processing unit selects and executes a first offset processing for a low-frequency component image when an image of the block has a feature associated with the low-frequency component image in accordance with a feature of an image of a processing target block, and selects and executes a second offset processing for a high-frequency component image when an image of the block does not have a feature associated with the low-frequency component image,
wherein the apparatus further comprises:
(a) a counting unit configured to count a number of pixels, for each selected band of a plurality of bands, of the processing target block of the decoded image having undergone the deblocking filtering, whose pixel values belongs to the selected band, wherein the plurality of bands are obtained by dividing, into a plurality of portions, a range of values which pixel values are configured to take; and
(b) a decision unit configured to decide a starting band position of a predetermined number of consecutive bands of the plurality of bands, wherein the number of pixels included in the consecutive bands is the largest, and
wherein the offset processing unit selects the first offset processing when the number of pixels included in the predetermined number of bands from the decided starting band position is not less than a second threshold, and selects the second offset processing when the number of pixels included in the predetermined number of bands from the decided starting band position is less than the second threshold.

2. The apparatus according to claim 1, wherein when one of the first offset processing and the second offset processing is selected, the offset processing unit calculates a cost corresponding to an image quality improvement effect based on the selected offset processing, and executes the selected offset processing when the cost is higher than a predetermined value.

3. The apparatus according to claim 2, wherein the offset processing unit compares sums of absolute difference values between the decoded image having undergone the deblocking filtering and the encoding target image when the selected offset processing is performed and when the selected offset processing is not performed, and sets a difference between the compared sums of absolute difference values as a cost.

4. The apparatus according to claim 1, wherein the low-frequency component image is an image of a flat portion, and the high-frequency component image is an image of an edge portion.

5. An image capturing apparatus comprising:
an image capturing unit configured to capture an object image and output an encoding target image; and
a moving image encoding apparatus including:
an encoding unit configured to perform predictive encoding for an encoding target image on a block basis;
a decoding unit configured to generate a decoded image by decoding the target image having undergone the predictive encoding;
a filter unit configured to apply deblocking filtering to the decoded image; and
an offset processing unit configured to perform an offset processing for the decoded image having undergone the deblocking filtering,
wherein the encoding unit performs the predictive encoding based on the decoded image having undergone the offset processing by the offset processing unit,
wherein the offset processing unit selects and executes a first offset processing for a low-frequency component image when an image of the block has a feature associated with the low-frequency component image in accordance with a feature of an image of a processing target block, and selects and executes a second offset processing for a high-frequency component image when an image of the block does not have a feature associated with the low-frequency component image,
wherein the apparatus further comprises:
(a) a counting unit configured to count a number of pixels, for each selected band of a plurality of bands, of the processing target block of the decoded image having undergone the deblocking filtering, whose pixel values belongs to the selected band, wherein the plurality of bands are obtained by dividing, into a plurality of portions, a range of values which pixel values are configured to take; and
(b) a decision unit configured to decide a starting band position of a predetermined number of consecutive bands of the plurality of bands, wherein the number of pixels included in the consecutive bands is the largest, and
wherein the offset processing unit selects the first offset processing when the number of pixels included in the predetermined number of bands from the decided starting band position is not less than a second threshold, and selects the second offset processing when the number of pixels included in the predetermined number of bands from the decided starting band position is less than the second threshold.

6. A moving image encoding method comprising:
performing predictive encoding for an encoding target image on a block basis;
generating a decoded image by decoding the target image having undergone the predictive encoding;
applying deblocking filtering to the decoded image; and
performing an offset processing for the decoded image having undergone the deblocking filtering,
wherein in performing the predictive encoding, the predictive encoding is performed based on the decoded image having undergone the offset processing,
wherein in performing the offset processing, a first offset processing for a low-frequency component image is selected and executed when an image of the block has a feature associated with the low-frequency component image in accordance with a feature of an image of a processing target block, and a second offset processing for a high-frequency component image is selected and executed when an image of the block does not have a feature associated with the low-frequency component image,
wherein the method further comprises:
(a) counting a number of pixels, for each selected band of a plurality of bands, of the processing target block of the decoded image having undergone the deblocking filtering, whose pixel values belongs to the selected band, wherein the plurality of bands are obtained by dividing, into a plurality of portions, a range of values which pixel values are configured to take; and
(b) deciding a starting band position of a predetermined number of consecutive bands of the plurality of bands, wherein the number of pixels included in the consecutive bands is the largest,
wherein in the offset processing, the first offset processing is selected when the number of pixels included in the predetermined number of bands from the decided starting band position is not less than a second threshold, and the second offset processing is selected when the number of pixels included in the predetermined number of bands from the decided starting band position is less than the second threshold.

7. A non-transitory computer-readable storage medium storing a computer program which causes a computer to function as a moving image encoding apparatus comprising:
an encoding unit configured to perform predictive encoding for an encoding target image on a block basis;
a decoding unit configured to generate a decoded image by decoding the target image having undergone the predictive encoding;
a filter unit configured to apply deblocking filtering to the decoded image; and
an offset processing unit configured to perform an offset processing for the decoded image having undergone the deblocking filtering,
wherein the encoding unit performs the predictive encoding based on the decoded image having undergone the offset processing by the offset processing unit,
wherein the offset processing unit selects and executes a first offset processing for a low-frequency component image when an image of the block has a feature associated with the low-frequency component image in accordance with a feature of an image of a processing target block, and selects and executes a second offset processing for a high-frequency component image when an image of the block does not have a feature associated with the low-frequency component image,
wherein the apparatus further comprises:
(a) a counting unit configured to count a number of pixels, for each selected band of a plurality of bands, of the processing target block of the decoded image having undergone the deblocking filtering, whose pixel values belongs to the selected band, wherein the plurality of bands are obtained by dividing, into a plurality of portions, a range of values which pixel values are configured to take; and
(b) a decision unit configured to decide a starting band position of a predetermined number of consecutive bands of the plurality of bands, wherein the number of pixels included in the consecutive bands is the largest, and
wherein the offset processing unit selects the first offset processing when the number of pixels included in the predetermined number of bands from the decided starting band position is not less than a second threshold, and selects the second offset processing when the number of pixels included in the predetermined number of bands from the decided starting band position is less than the second threshold.

* * * * *